US008265346B2

(12) United States Patent
Blair

(10) Patent No.: US 8,265,346 B2
(45) Date of Patent: Sep. 11, 2012

(54) DETERMINING DOCUMENT FITNESS USING SEQUENCED ILLUMINATION

(75) Inventor: Ronald Bruce Blair, Flower Mound, TX (US)

(73) Assignee: De La Rue North America Inc., Irving, TX (US)

( * ) Notice: Subject to any disclaimer, the term of this patent is extended or adjusted under 35 U.S.C. 154(b) by 763 days.

(21) Appl. No.: 12/323,109

(22) Filed: Nov. 25, 2008

(65) Prior Publication Data

US 2010/0128965 A1 May 27, 2010

(51) Int. Cl.
*G06K 9/00* (2006.01)
*G06K 9/74* (2006.01)

(52) U.S. Cl. ............... 382/112; 382/274; 356/71

(58) Field of Classification Search .......... 382/100, 382/101, 103, 106, 108, 112–116, 123, 135–140, 382/149, 155, 162, 168, 173, 181, 199, 209, 382/219, 232, 254, 274–275, 276, 286, 287–294, 382/305, 312, 321; 250/559.08, 458.1, 556; 271/265.04; 356/71
See application file for complete search history.

(56) References Cited

U.S. PATENT DOCUMENTS

| | | | |
|---|---|---|---|
| 4,650,319 A | | 3/1987 | Stenzel et al. |
| 5,498,879 A | * | 3/1996 | De Man ............ 250/556 |
| 6,111,261 A | * | 8/2000 | Bolza-Schunemann et al. ............ 250/559.08 |
| 6,249,591 B1 | | 6/2001 | Tullis |
| 6,256,407 B1 | | 7/2001 | Mennie et al. |
| 6,347,163 B2 | | 2/2002 | Roustaei |
| 6,766,045 B2 | * | 7/2004 | Slepyan et al. ........... 382/135 |
| 6,839,128 B2 | | 1/2005 | Premjeyanth et al. |
| 6,913,260 B2 | * | 7/2005 | Maier et al. ............ 271/265.04 |
| 6,937,322 B2 | | 8/2005 | Gerz et al. |
| 6,962,247 B2 | | 11/2005 | Maier et al. |
| 7,218,386 B2 | * | 5/2007 | Alcock et al. ............ 356/71 |
| 7,372,990 B2 | | 5/2008 | Yamauchi et al. |
| 7,583,846 B2 | | 9/2009 | Yamauchi et al. |
| 7,657,112 B2 | | 2/2010 | Kuwabara |
| 7,737,417 B2 | * | 6/2010 | Giering et al. ............ 250/458.1 |
| 7,864,381 B2 | | 1/2011 | Scott |

(Continued)

FOREIGN PATENT DOCUMENTS

EP 1250682 B1 8/2008

(Continued)

OTHER PUBLICATIONS

PCT/US09/63148 Written Op, Jun. 22, 2010, De La Rue North America.

(Continued)

*Primary Examiner* — Seyed Azarian
(74) *Attorney, Agent, or Firm* — Afghani Law Firm; Kevin Afghani

(57) ABSTRACT

The present invention provides a method for determining the physical fitness of documents such as bank notes. The method comprises passing a document past an image sensor while sequentially illuminating the document using multi-mode illumination, wherein a predetermined mode of illumination is used for each line scanned by the image sensor, producing an interleaved image of the document. A multi-dimensional transformation function is applied to this interleaved image to produce a composite measurement, which is then projected onto an empirically determined fitness vector to yield a scalar fitness value for the document. This value is compared against empirically prescribed fitness values to determine if the document is fit enough to remain in circulation or should be taken out of circulation and retired (destroyed).

13 Claims, 9 Drawing Sheets

U.S. PATENT DOCUMENTS

| | | | |
|---|---|---|---|
| 7,978,899 B2 * | 7/2011 | Jenrick et al. | 382/135 |
| 8,004,725 B2 | 8/2011 | Schnitzlein | |
| 2003/0030785 A1 | 2/2003 | Christophersen | |
| 2006/0115139 A1 | 6/2006 | Joshi et al. | |
| 2006/0159329 A1 | 7/2006 | Joshi et al. | |
| 2007/0216976 A1 | 9/2007 | Endo et al. | |
| 2008/0054545 A1 | 3/2008 | Calverley et al. | |
| 2008/0116628 A1 | 5/2008 | Edwards et al. | |

FOREIGN PATENT DOCUMENTS

| | | |
|---|---|---|
| JP | 10-116369 | 5/1998 |
| JP | 2003-272022 | 9/2003 |
| JP | 2006053736 A1 | 2/2006 |
| KR | 1020010090049 | 10/2001 |
| KR | 1020080094426 | 10/2008 |

OTHER PUBLICATIONS

PCT/US2009/063146 Written Opinion of the International Searching Authority; Mailed Jun. 22, 2010; Applicant: De La Rue North America, Inc.

PCT/US2010/047485 Written Opinion of the International Searching Authority; Mailed May 30, 2011; Applicant: De La Rue North America, Inc.

U.S. Appl. No. 12/277,936; Non-Final Office Action dated Jul. 20, 2011; First Named Inventor: Ronald Bruce Blair.

U.S. Appl. No. 12/277,936; Final Office Action dated Dec. 20, 2011; First Named Inventor: Ronald Bruce Blair.

U.S. Appl. No. 12/277,936; Non-Final Office Action dated May 22, 2012; First Named Inventor: Ronald Bruce Blair.

U.S. Appl. No. 12/683,932; Non-Final Office Action dated May 22, 2012; First Named Inventor: Ronald Bruce Blair.

* cited by examiner

| Line | Red | Green | Blue | IR |
|---|---|---|---|---|
| 1 | 255 | 0 | 0 | 0 |
| 2 | 0 | 255 | 0 | 0 |
| 3 | 0 | 0 | 255 | 0 |
| 4 | 0 | 0 | 0 | 255 |
| 5 | 255 | 255 | 255 | 0 |

600

DETERMINING DOCUMENT FITNESS USING SEQUENCED ILLUMINATION

BACKGROUND OF THE INVENTION

1. Technical Field

The present invention relates generally to currency processing machines, and more specifically to a system and method for assessing the fitness of notes by recording images of the notes using multiple modes of illumination that facilitate optimal imaging of specific features.

2. Description of Related Art

Automated, high-volume currency processing is a growing international industry affecting numerous aspects of the distribution, collection, and accounting of paper currency. Currency processing presents unique labor task issues that are intertwined with security considerations. It requires numerous individual tasks, for example: the collection of single notes by a cashier or bank teller, the accounting of individual commercial deposits or bank teller pay-in accounts, the assimilation and shipment of individual deposits or accounts to a central processing facility, the handling and accounting of a currency shipment after it arrives at a processing facility, and the processing of individual accounts through automated processing machines. Any step in the process that can be automated, thereby eliminating the need for a human labor task, saves both the labor requirements for processing currency and increases the security of the entire process. Security is increased when instituting automated processes by eliminating opportunities for theft, inadvertent loss, or mishandling of currency and increasing accounting accuracy.

A highly automated, high-volume processing system is essential to numerous levels of currency distribution and collection networks. Several designs of high-volume processing machines are available in the prior art and used by such varied interests as national central banks, independent currency transporting companies, currency printing facilities, and individual banks. In general, currency processing machines utilize a conveyer system which transports individual notes past a series of detectors. By way of example, a note may be passed through a series of electrical transducers designed to measure the note's width, length, and thickness. The next set of sensors could be optical sensors recording the note's color patterns or serial number. Detectors can likewise be used to detect specific magnetic or other physical characteristics of individual notes.

High volume currency processing machines typically pull individual notes from a stack of currency through a mechanical conveyer past several different detectors in order to facilitate the sorting of the individual notes and the accumulation of data regarding each note fed through the machine. For example, a currency processing machine can perform the simple tasks of processing a stack of currency in order to ensure that it is all of one denomination with proper fitness characteristics while simultaneously counting the stack to confirm a previous accounting. A slightly more complex task of separating a stack of currency into individual denominations while simultaneously counting the currency can be accomplished as well.

On the more complex end of prior art currency processing machines, a stack of currency consisting of various denominations can be fed into the machine for a processing that results in the separation of each denomination, a rejection of any currency that does not meet fitness specifications, the identification of counterfeit bills, and the tracking of individual notes by serial number.

Determining the fitness of currency notes is a top priority of both central banks and major money center banks. The goal of monetary authorities is to keep in circulation only those bills that meet specific fitness criteria (e.g., soiling, ink wear). Traditionally, central banks have made fitness determinations themselves. However, more and more of this work is being pushed onto large money center commercial banks that process large volumes of currency.

Monetary authorities are confronted with the difficult balancing act of setting criteria that will minimize the number of unfit bills that remain in circulation while also minimizing fit bills that are mistakenly removed from circulation (the classic type 1 and type 2 errors). This difficulty is compounded by the fact that the physical characteristics of currency bills might vary slightly depending on their source of production (this is particularly true of the Euro, which is a multinational currency). As such, perfectly fit notes produced in one location may be erroneously pulled from circulation by a bank in another location because it falls outside the parameters of the fitness tests used by the banks. The unnecessary destruction of fit currency notes results in millions in losses to central banks every year.

A large contributor to this problem is the limitation of current technology used for determining fitness. For example, imaging technologies currently in use can have trouble determining the degree of soiling or ink wear on a bill. Variations in printing ink may make a bill appear darker and more soiled than it is depending on the parameters and calibration of the imaging device. Another example relates to the physical integrity of the note. A common problem confronting current imaging technology is the use of transparent adhesive tape to repair torn bills. As material science has continued to improve, transparent tape has become more and more clear and harder to detect visually.

Another factor contributing to the difficulty of determining fitness lies in the parameters and tests themselves that are typically employed. The testing standards today are based largely on the technical limitations of older technology. The physical characteristics and parameters that are currently tested were chosen mainly by default because that was what the technology at the time was capable of detecting. Over time these de facto standards have become official standards with which new technologies must now comply, despite the ability to employ newer more reliable parameters.

SUMMARY OF INVENTION

The present invention provides a method for determining the physical fitness of documents such as bank notes. The method comprises passing a document past an image sensor such as a line scan camera while sequentially illuminating the document using multi-mode illumination, wherein a predetermined mode of illumination is used for each line scanned by the camera, producing an interleaved image of the document. A multi-dimensional transformation function is applied to this interleaved image to produce a composite measurement, which is then projected onto an empirically determined fitness vector to yield a scalar fitness value for the document. This value is compared against empirically prescribed fitness values to determine if the document is fit enough to remain in circulation or should be taken out of circulation and retired (destroyed).

The mode of illumination is determined by parameters such as the color of light, the angle of incidence to the document, and the use of reflective or transmissive illumination. Any or all of these parameters may be used to control the type of illumination used for each scan line and may change for each scan line in a preprogrammed, interleaved manner, depending on the particular features of the document being recorded.

BRIEF DESCRIPTION OF THE DRAWINGS

The novel features believed characteristic of the invention are set forth in the appended claims. The invention itself, however, as well as the preferred mode of use, further objectives and advantages thereof, will be best understood by reference to the following detailed description of illustrative embodiments when read in conjunction with the accompanying drawings, wherein:

DETAILED DESCRIPTION

Figure 1:
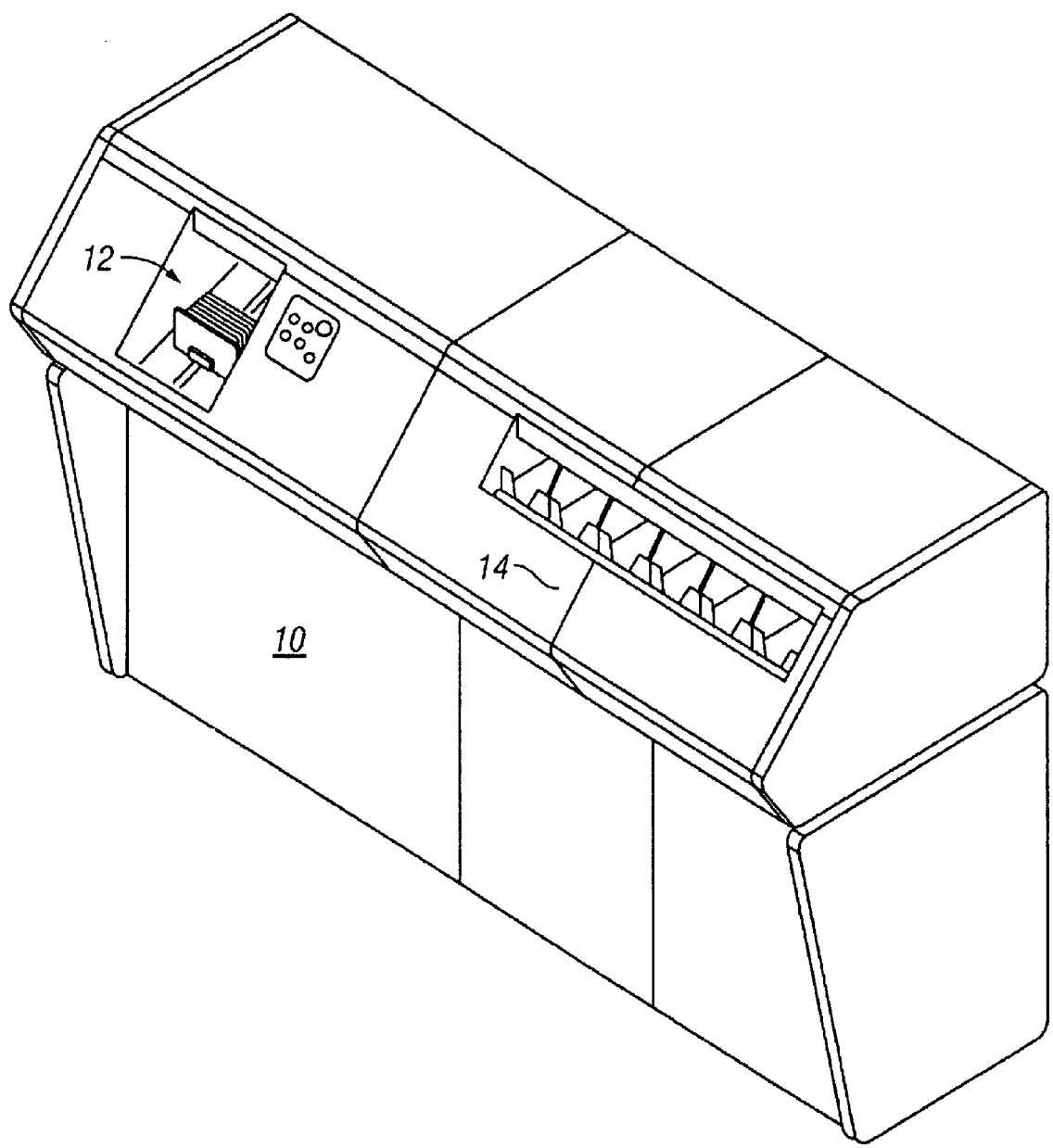
FIG. 1 shows a currency processing machine embodying the present invention and loaded with a batch feed of currency prior to starting the currency processing cycle.

FIG. 1 shows a currency processing machine 10 embodying the present invention and loaded with a batch feed of currency 12 prior to starting the currency processing cycle. This batch feed of currency 12 is fed into the currency processing machine one single note at a time. Single notes then travel on a conveyer past several different detectors before being deposited in one of the sort bins 14. Typically, a single sort bin is used to accumulate a single denomination of note at the end of the sort process.

Soil may be defined as a general distribution of dirt across the entire banknote. Ink wear, graffiti and stain detection are sometimes also described as soil detection. Soiling of banknotes increases the optical density of the notes and decreases their reflectance. One difficulty when performing soil detection is to match human perception and machine perception. This involves two major issues. The first is perception complexity, which includes determining soil categories and setting up parameters for such categories. The other issue is measurement errors resulting from production variations between notes and measurement "noise." In order to match human perception, the colors of the illumination have to be chosen very carefully.

Figure 2:
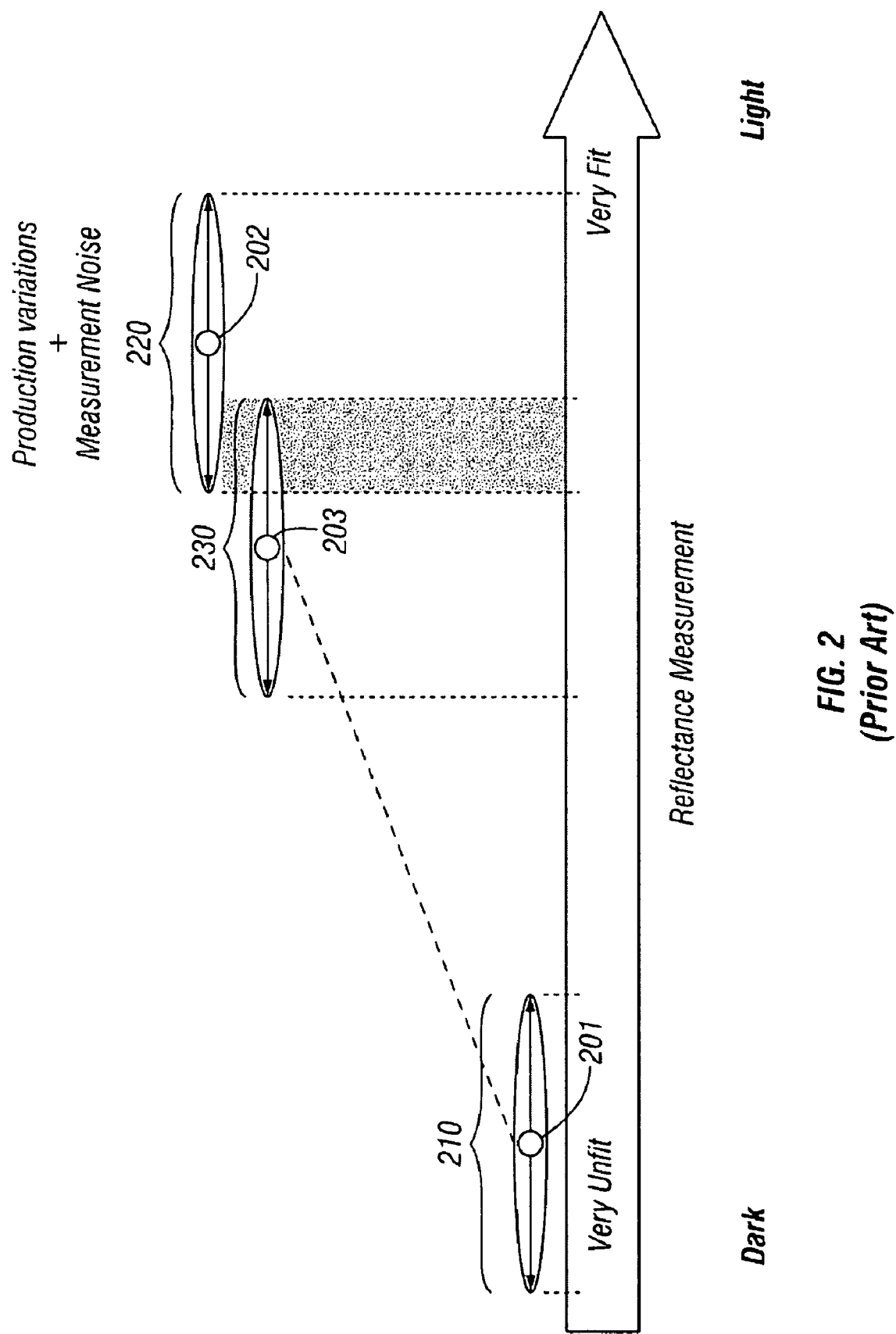
FIG. 2 illustrates the problem presented by measurement errors in accordance with the prior art.

FIG. 2 illustrates the problem presented by measurement errors in accordance with the prior art. It shows how light reflectance is used to determine soiling based on a reflectance measurement within a single spectrum. As shown on the sliding scale at the bottom of the figure, the degree of fitness is based on the amount of light reflectance, with images at one end constituting very unfit notes due to soiling, and images at the opposite end constituting very fit notes. Prior art imaging techniques typically involve reflectance measurements using a single spectrum of light (e.g., white light or a single isolated color). Unfortunately, with this approach, some notes might fall within the accepted error range for fit notes when in fact the notes are less fit than desired.

In the present example, point 202 represents notes of a single fitness class. The fitness measurement for this class is spread over a range of values 220 on the fitness scale to accommodate productions variations and measurement noise. Unfortunately, as shown in FIG. 2, this range of values can partially overlap the adjacent measurement range 230 of another fitness class 203. The issue of production variation is of particular importance to a multinational currency such as the Euro which is produced in several locations throughout Europe, each varying slightly in paper and ink quality.

Reflectance measurements for fitness classes 201 and 202 at the extreme ends of the measurement scale represent the easiest instances of fitness determination. A measurement that falls between the ends of the spectrum can produce an inaccurate or suboptimal testing result due to overlap between error ranges. In the present example, fitness class 203 deviates significantly from a measurement of very fit 202. However, as noted above the error range 230 for fitness class 203 partially overlaps with the error range 220 for very fit notes in class 202, resulting in the potential misidentification of notes as being fitter than they actually are, thereby significantly reducing the marginal accuracy of this measurement technique.

The limitation of the prior art illumination technique is that it relies exclusively on reflectance measurements over a single spectrum of light, producing a one dimensional metric. With a one dimensional measurement, soil level separation is only available along one axis of the graph. Unfortunately, the limitations of prior art technology have been institutionalized. Despite the limitations of using single spectrum reflectance for note imaging, the parameters for single spectrum reflectance (principally white light) form the basis for the standards and procedures for determining fitness. It is an example of de facto parameters based on the limits of existing and past technology becoming official standards to which future technologies must then conform.

The present invention replaces the single white light reflectance measurement of the prior art with sequenced illumination using different wavelengths of light (e.g., red, green, blue, UV, IR). Soiling of the note (including ink wear) produces different reflectance effects in each color, which are not visible in a single white light image.

Figure 3:
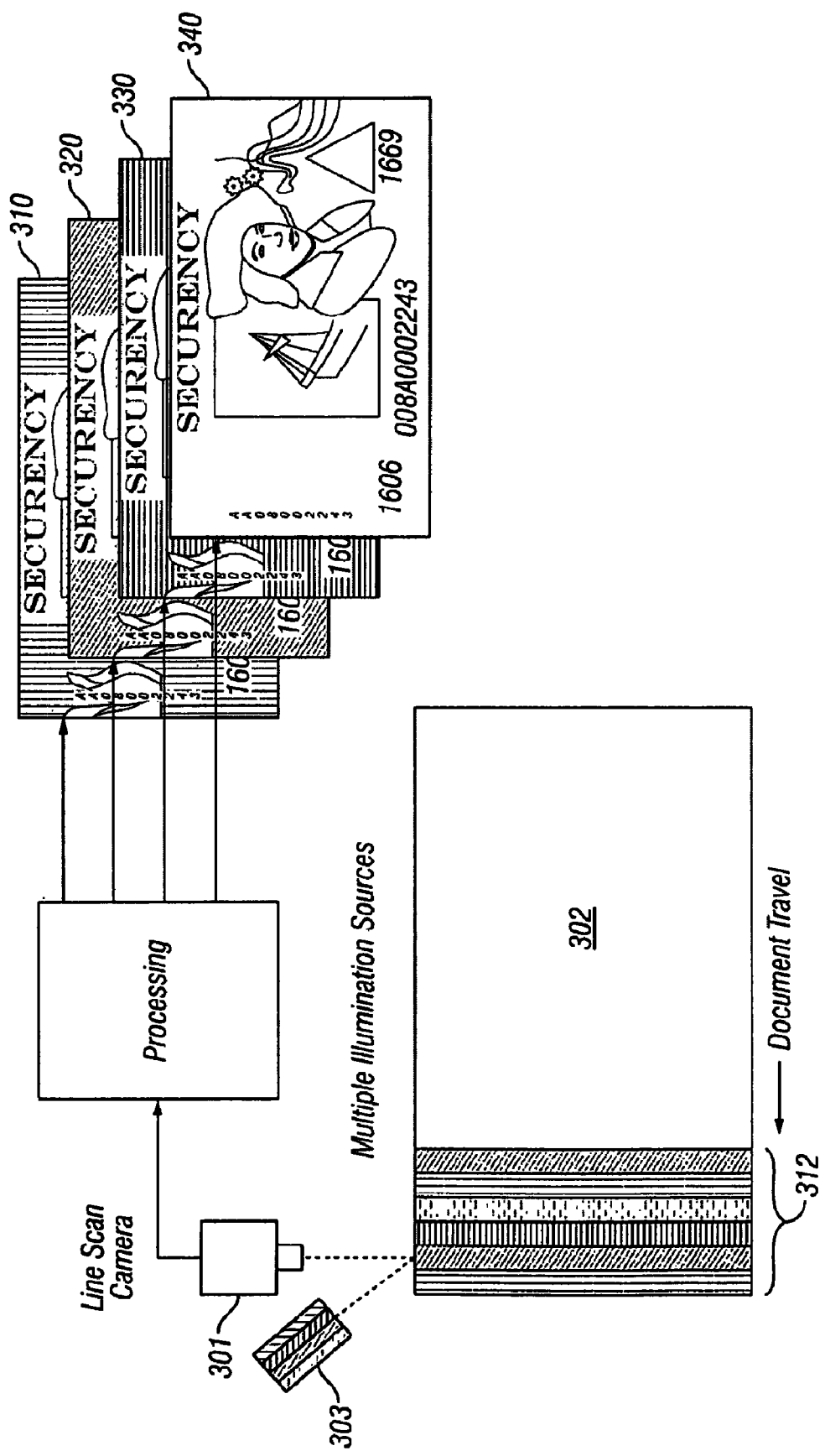
FIG. 3 illustrates the operation of sequenced illumination in bank note imaging in accordance with the present invention.

FIG. 3 illustrates the operation of sequenced illumination in bank note imaging in accordance with the present invention. The invention uses a standard line scan camera 301 to capture an image of a note 302 as the note passes by in the direction indicated by the arrow. A light source (light stick) 303 illuminates the passing note 302 using light emitting diodes (or similar light elements) that emit different wavelengths of light in a variable, sequential manner.

This sequenced illumination produces an interleaved image in which each line scanned by the camera 301 is recorded under the illumination of a different wavelength of light in a pre-determined sequence (e.g., red, green, blue, UV, red, green, blue, UV, etc.) until the entire note 302 is scanned. FIG. 3 shows the interleaved pattern 312 superimposed on the note 302 to help illustrate this concept. In the present example, the interleaved image can be separated into red 310, green 320, blue 330, and ultraviolet (UV) 340 reflective images. The simple repeating RGBUV pattern used in FIG. 3 is a simplified example, but it clearly illustrates the concept.

At a minimum, the light source 303 uses two different wavelengths. In a preferred embodiment, four wavelengths are used. The illumination switching between the different colors is synchronized with the image capture by the camera 301 and may use a simple repeating pattern such as that described above or a more complex pattern (explained in more detail below).

Figure 4:
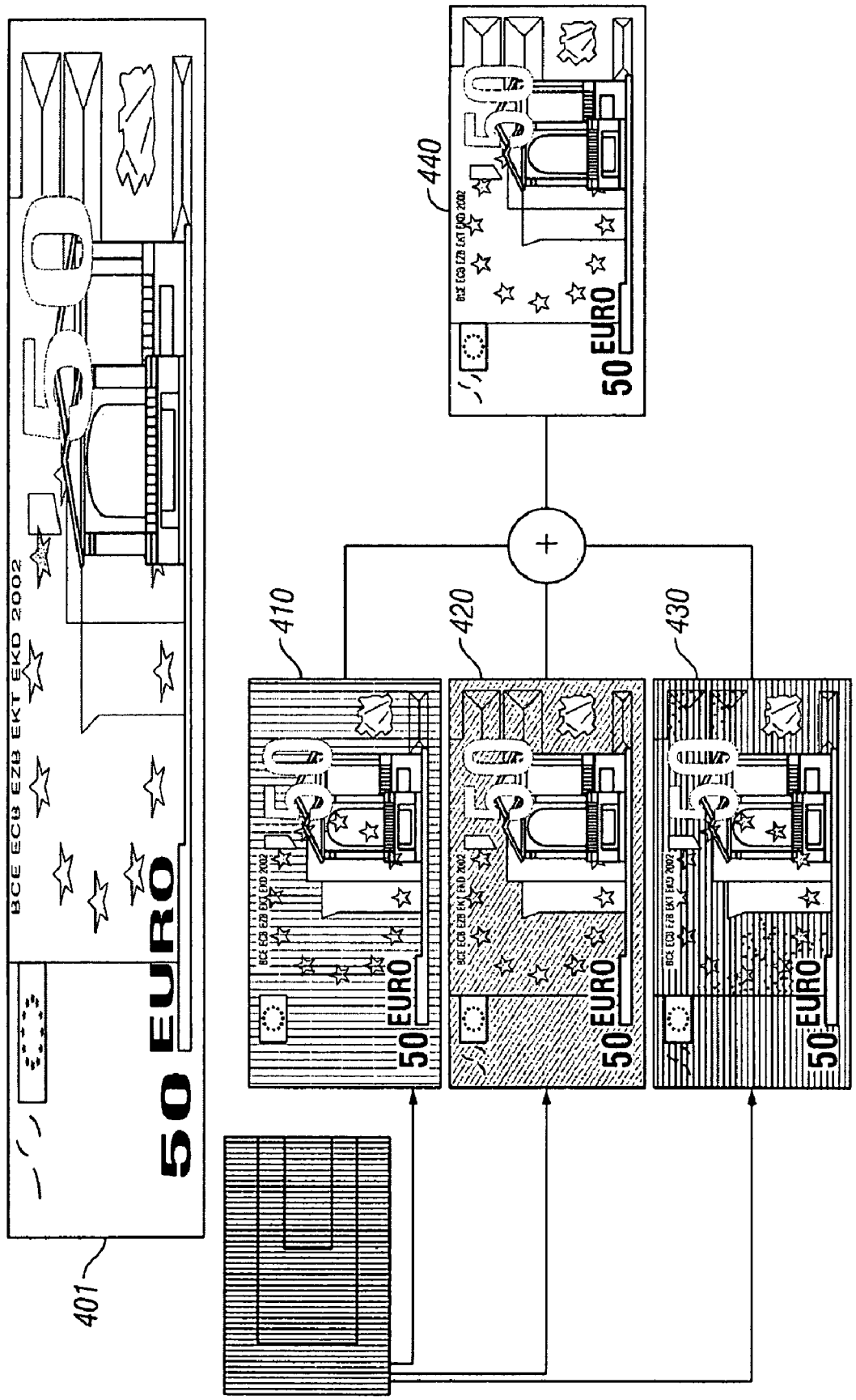
FIG. 4 shows an example of a raw interleaved image recorded by the line scan camera and its division into separate RGB images in accordance with the present invention.

FIG. 4 shows an example of a raw interleaved image 401 recorded by the line scan camera. This image includes all of the lines scanned under different wavelengths of light (e.g., RGB) combined together in sequence. The interleaved image 401 is elongated because the image is sampled at a higher rate than single reflectance white light illumination to preserve image resolution. Below the interleaved image 401 are the individual images 410, 420, 430 that result from separating the scan lines according to color (red, green and blue). The separate RGB images 410, 420, 430 can be combined into a single composite image 440 equivalent to white light illumination. The composite image can serve as the white light reflectance image against which the individual color reflectance images can be compared.

It should be emphasized that images 410, 420, 430 are not color images. All of the scan lines, regardless of the color emitted by the light source, are recorded by the same camera in greyscale. However, the reflection of light will differ according to the color of the light. This is due to the way photons of different wavelengths interact with ink and surface features on the note (including soiling). As a consequence, even though the reflective images produced under different wavelengths of illumination are all recorded in greyscale, each image reveals features not seen in the others, as shown in FIG. 4.

An essential element of the efficacy of the present invention is the recording of the different wavelength images at the same location by the same camera. If the different images were recorded separately at different locations, slight variations in the position of the note relative to each camera would make it more difficult to composite and compare the separate wavelength images, thereby greatly reducing the accuracy of the fitness determination.

The present invention increases the accuracy of fitness determination by turning light reflectance into a multi-dimensional measurement that can overcome the deficiencies of single-dimensional analysis noted above. Whereas the prior art as represented in FIG. 2 was limited to merely measuring the reflectance over a fixed spectrum in terms of brighter or darker, the present invention allows the cross referencing of reflected light of different wavelengths and different illumination modes. This technique eliminates much of the inaccuracy of fitness determination resulting from production variations and measurement noise.

In addition to using different wavelengths of reflected light, sequenced illumination may also alternate between reflective and transmissive illumination, as well as illumination from different angles of incidence to the note (different azimuths).

Figures 5, 6:
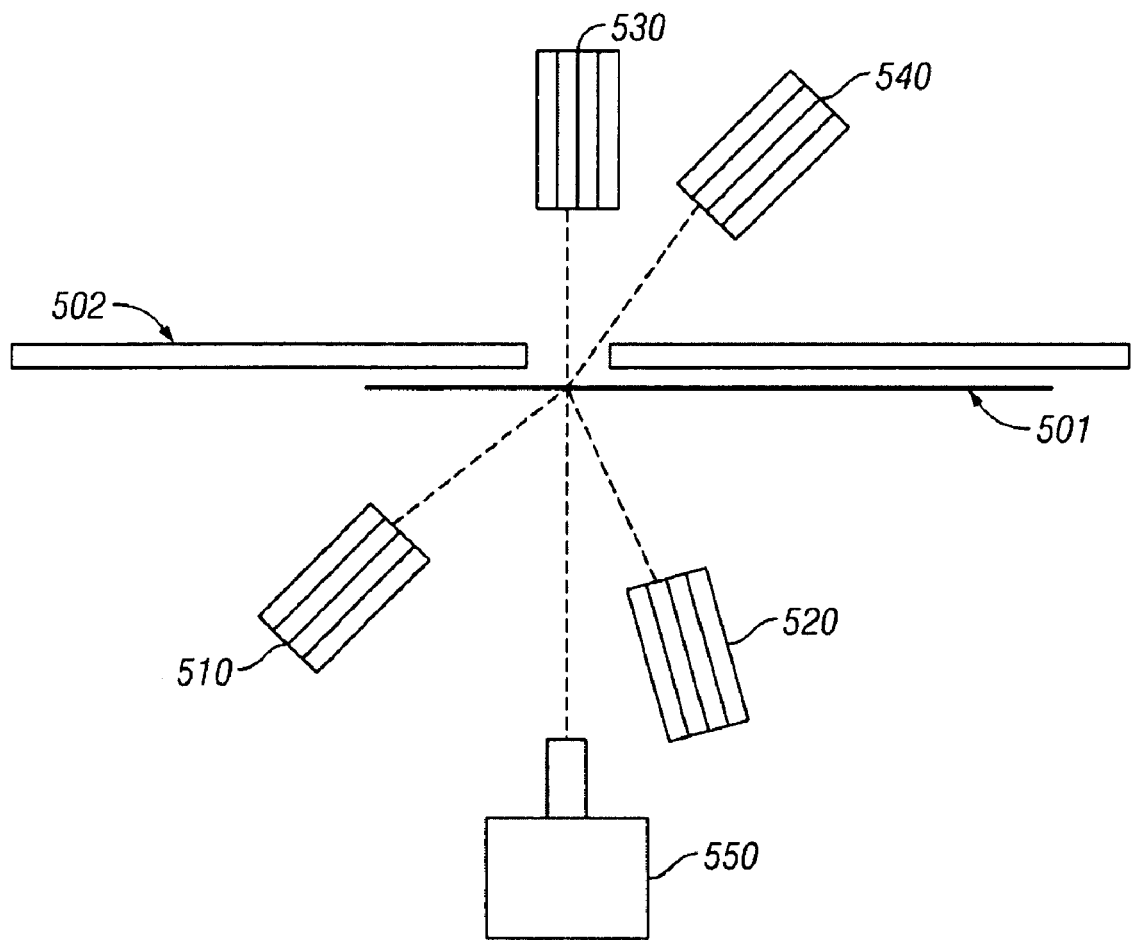
FIG. 5 shows an arrangement of light sources capable of implementing the different modes of sequenced illumination in accordance with the present invention.
FIG. 6 illustrates an example lookup table used to control sequenced illumination in accordance with the present invention.

FIG. 5 shows an arrangement of light sources capable of implementing the different modes of sequenced illumination in accordance with the present invention. Whereas the example shown in FIG. 3 only covers the multi-wavelength reflectance mode of sequential illumination, the configuration shown in FIG. 5 also covers the multi-azimuth and reflective/transmissive modes.

In this example, the currency note 501 moves along a straight note guide 502 in the currency processor. It should be pointed out that in some embodiments, the note guide 502 may be curved. However, the straight note guide in the present example allows for easier illustration.

Light sources 510 and 520 are used in the multi-azimuth mode of operation. Similar to the light source shown in FIG. 3, light sources 510 and 520 can each illuminate the passing note 501 using alternating wavelengths as described above. Because light sources 510 and 520 are positioned at different azimuths relative to the note 501, the reflected image recorded by the line scan camera 550 will differ between the two azimuths if the note includes features printed with optically variable ink (OVI). Therefore, in addition to interleaving different reflected wavelengths from the same light source (as shown in FIG. 3), the present invention can also interleave reflective images produced by different azimuths of illumination.

OVI produces different reflective colors (e.g., magenta and green) at different angles of incidence, even if the wavelength of illumination is the same for both angles. More to the point, OVI should produce different reflective colors when illuminated from different angles. However, significant ink wear or soiling of the OVI can reduce this differential between the azimuths of illumination. In this respect, fitness determination has an indirect security benefit by determining if security features incorporated into a note are physically fit enough to still be operationally viable. In fact, many monetary authorities may base the level of fitness of notes primarily upon the fitness of the security features. If OVI or watermarks become too worn or soiled to accurately determine if a note is legitimate, there is no point in keeping that note in circulation.

The concept of making a decision on note fitness based on the combination of soil measurement and the quality of a security feature can be further enhanced by applying separately measured values to a combinational transformation function resulting in an overall fitness score (explained in more detail below; see FIG. 9). Therefore, depending on the user (e.g., Commercial Bank versus Central Bank), the decision on note fitness can have a different balance between soiling/security feature wear as represented by the combined fitness value. For example, a Commercial Bank may be inclined to reissue notes that have good enough soil levels regardless of the security feature wear as long as the notes still pass authentication. In contrast, a Central Bank potentially would be more concerned about the quality of the security features and would apply stricter standards.

Therefore, different transformation functions or thresholds can be set up for certain types of sorter users. This implies a two-step transformation: 1) a soil measurement based on the illumination sequence and the measurement of security wear also based on the illumination sequence and its azimuths, and 2) transforming the combination of soil and security wear.

The light source 530 positioned behind the note 501 provides transmissive illumination through the note 501 as the note passes a gap in the note guide 502. Just as soiling and ink wear will alter the reflectance of light off the surface of a note they will also alter the way light passes through a note. Transmissive illumination is obviously the best method for testing the presence and fitness of watermarks in a note. The difference between reflective and transmissive illumination can be compared for different wavelengths of light. As with the other modes of sequenced illumination described above, images produced by reflective and transmissive illumination (of whatever wavelength) can be interleaved.

The last illumination source 540 provides diffused indirect, transmissive illumination that can be interleaved and compared to direct transmissive and/or reflective illumination.

As should be apparent from the above description, the degrees of freedom possible with sequenced illumination can produce significant complexity in the control of illumination switching. In addition to determining which light source to use for each line scanned by the camera, the control system must also determine which wavelength of light to emit from the chosen source.

FIG. 6 illustrates an example lookup table used to control sequenced illumination in accordance with the present invention. The lookup table 600 is stored in the memory of the control system. There is a separate memory address for each line of the image recorded by the camera, represented by the rows in the table. Each column represents a different source of illumination, which includes all of the LEDs on all of the light sticks in the machine.

The lookup table shown in FIG. 6 is a simplified example that only includes five image scan lines and four illumination sources. In this example, the illumination sources are the different color LEDs present in one light stick, which are red, green, blue and infrared (IR). The number at the intersection of each row and column is the control byte applied to each LED array during the recording of that image line. The control bytes determine the intensity of illumination, produced by the LED in question. In the present example, a value of 255 represents full intensity, while a value of 0 represents off. In one embodiment, the control system might employ a value of 128, representing half intensity.

Applying this lookup table to the sequential illumination of a note, scan line 1 would be illuminated by red light, while the remaining LEDs remain off. For line 2, only the green LED is lit. Similarly, only the blue LED is lit for line 3, and only the IR LED is lit for line 4. For line 5, the red, green and blue LEDs are all lit at full intensity while the IR LED is off, thereby producing a white light reflectance.

For a more complex configuration such as the example shown in FIG. 5, the lookup table would include 16 columns in addition to the column listing the scan lines. These 16 columns would represent the four different color LEDs (e.g., red, green, blue, IR) present in each of the four light sticks 510, 520, 530, 540. The number of scan lines would depend on the length of the note being imaged, which may vary depending on the type and/or denomination of note.

The example illumination sequence represented by lookup table 600 is similar to the one illustrated in FIG. 3 and is deliberately very simple for ease of illustration. However, the sequential illumination pattern does not have to be a simple repeating sequence as shown in the above example. Because the present invention allows for the control of each LED for each image scan line, the illumination sequence can be customized for each type of note according its features.

The features of a note vary from one region of the note to another. Each of these features is best captured with a particular mode of illumination (i.e. color, azimuth, reflective or transmissive). For example, interleaving reflective images illuminated from different azimuths is best applied to the region of a note that is printed with OVI. Similarly, interleaving reflective with transmissive illumination might be more appropriate for the region of the note containing a watermark.

Because the particular features for each type, denomination and series of currency are already known to monetary authorities, an optimal illumination sequence can be formulated for each type of note and preprogrammed into the system with its own unique lookup table. Furthermore, the position of a note's features will vary according to the orientation of the note in front of the camera (i.e. left or right edge leading, front or back facing). Therefore, an optimal illumination pattern can also be formulated for each possible orientation of the note type in question.

Figure 7:
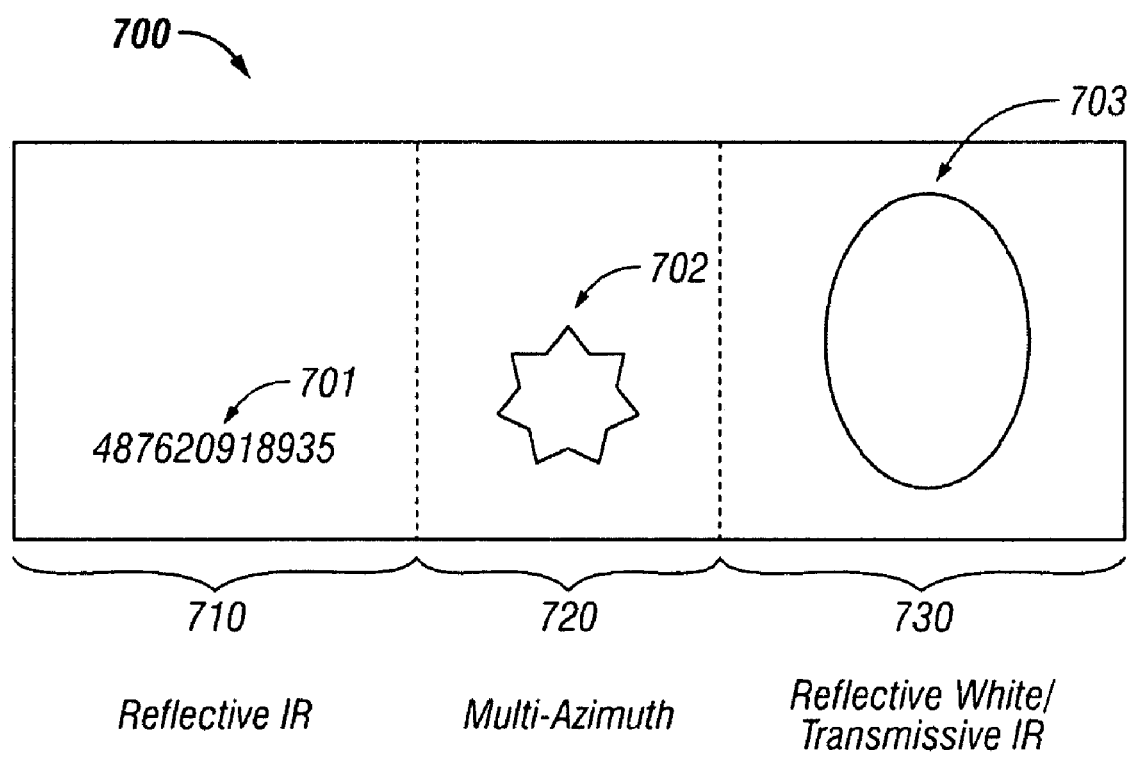
FIG. 7 shows a simplified example of how the illumination mode can be customized according to the features of a note.

FIG. 7 shows a simplified example of how the illumination mode can be customized according to the features of a note. In the first region 710 of the note 700, there is a serial number 701 which is most effectively captured under IR reflectance. For this region of the note, the illumination mode might simply use reflective IR from a single light stick for all of the scan lines that cover the position of the serial number. Alternatively, the sequence might interleave reflective IR lines with lines of another color from the same light stick, depending on the other features present in that region of the note.

In the middle region 720 of the note is an OVI symbol 702. For this region of the note the illumination mode would comprise multi-azimuth reflectance, interleaving lines illuminated from different angles of incidence. Typically, the same color of light would be used for both azimuths of illumination. However, this will depend on the specific characteristics of the note.

The last region 730 of the note includes a watermark area 703. In this region the illumination mode might interleave reflective white light with transmissive IR.

While FIG. 7 is obviously a very simplified example, it helps illustrate how sequential illumination can be applied using more complex, customized patterns beyond a simple RGBIR (or UV) repeating sequence.

The present invention allows the lookup table used for sequenced illumination to be changed on a note-by-note basis as notes are fed through the processing machine. In a preferred embodiment of the present invention, as each note is fed into the machine the system determines the note's currency type, its denomination, its series (year of production), and its physical orientation. This information is used by the sequenced illumination system to select the appropriate lookup table within its memory for execution. This process is repeated for each note fed into the currency processor, allowing sequenced illumination to be modulated on the fly.

In order to implement such an on-the-fly modulation of the sequenced illumination, the sensor used to determine note type and orientation is placed upstream of the sequenced illumination camera. In this configuration, the denomination sensor feeds information downstream to the sequenced illumination sensor, which then selects the appropriate lookup table before the note in question arrives at the camera.

However, the present invention also provides considerable operating flexibility and is capable of deploying the sequenced illumination sensor upstream of a denomination sensor or used as the denomination sensor itself. In such cases where fitness processing functions are performed on the same system as (or upstream of) the denomination sensor, a fixed, sequenced illumination pattern can be used instead of on-the-fly adjustments. In addition, some processing machines may employ multiple denomination sensors, wherein some of these sensors take advantage of information acquired upstream.

The number of sensors and their configuration can be customized to the needs of the user in question. Similarly, both fixed illumination sequences and note-to-note modulation of the illumination sequence can be used alone or in combination according to user needs.

Figure 8:
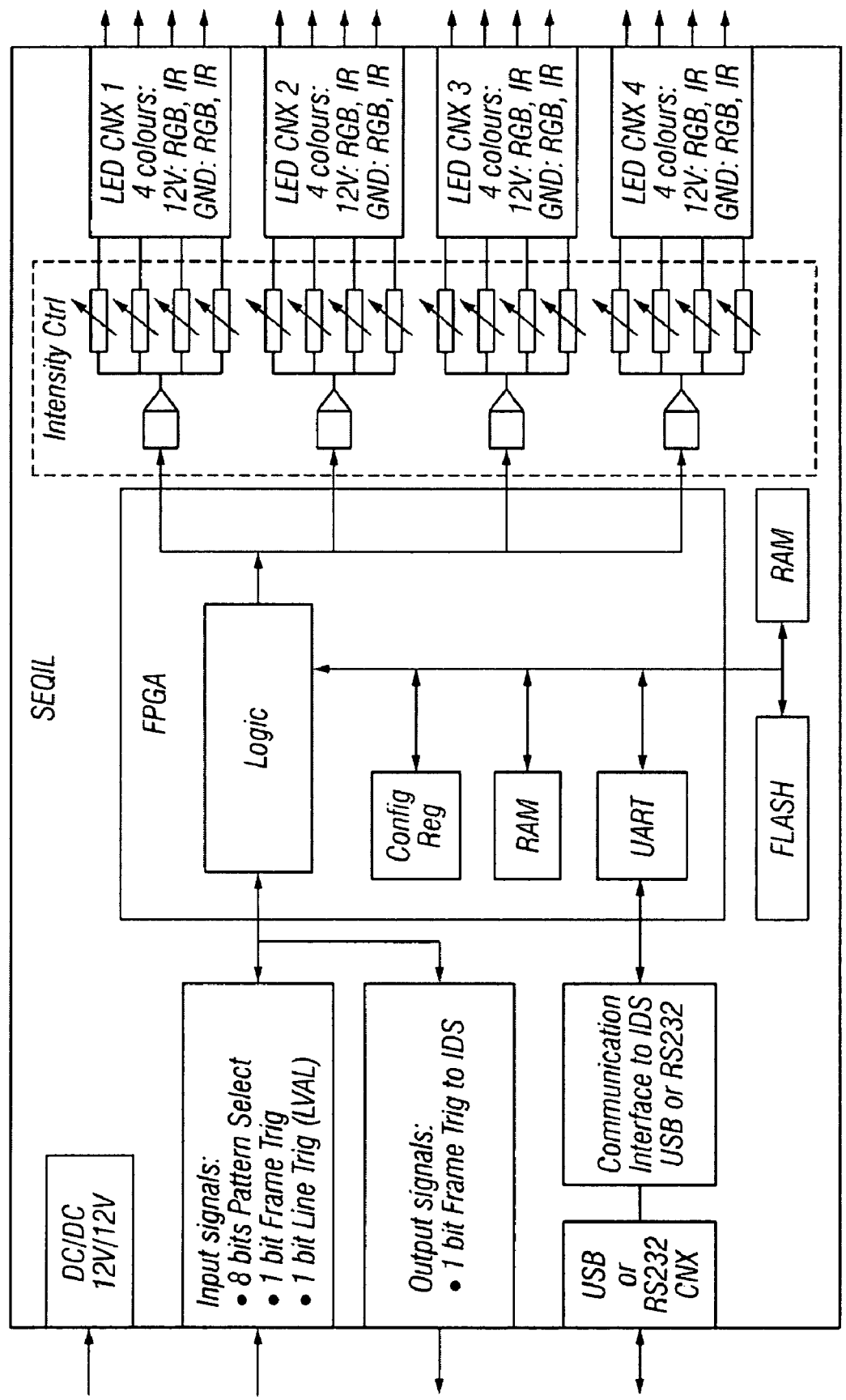
FIG. 8 is a simplified block diagram of the control system used for sequenced illumination in accordance with the present invention.

FIG. 8 is a simplified block diagram of the control system used for sequenced illumination in accordance with the present invention.

Figure 9:
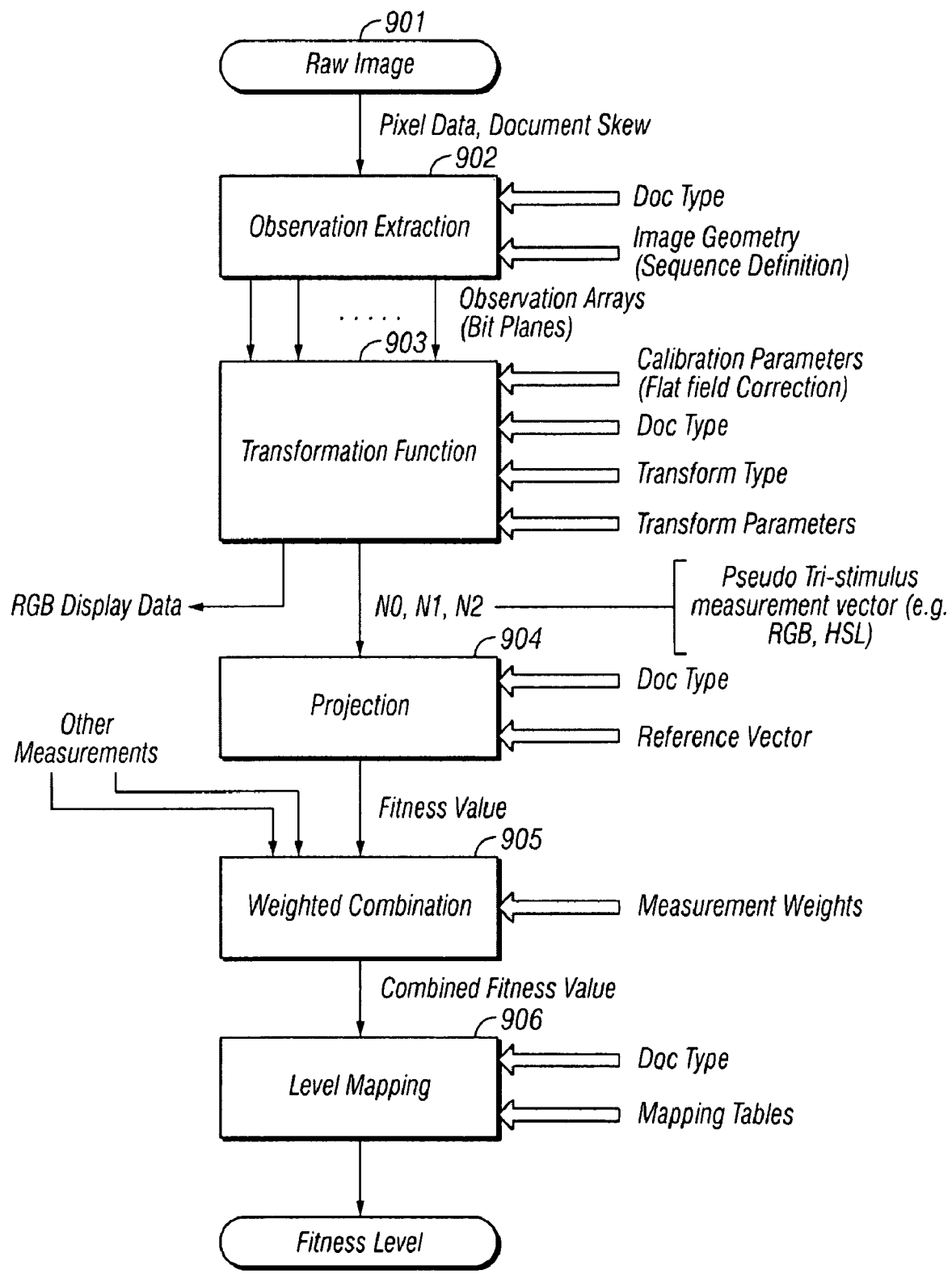
FIG. 9 is a flowchart that illustrates the overall process of applying sequenced illumination to determine fitness in accordance with the present invention.

FIG. 9 is a flowchart that illustrates the overall process of applying sequenced illumination to determine fitness in accordance with the present invention. The process begins with the acquisition of raw data (step 901). This involves the capture of the interleaved image using the methods described above.

Once the raw image is acquired, the next step is observation extraction (step 902). This is the process of extracting a multi-dimensional observation from the raw data based on the known document type: specific currency (e.g., US dollar or Euro), denomination and series (e.g., 1996 US twenty dollar bill), and specific orientation presented to the camera (e.g., front face left edge leading). Observation extraction is also based on the image geometry, which describes the illumination sequence (mode) that was used to acquire the raw data for this note type, as well as the known location and rotation of the document within the acquired image frame (document skew).

Following observation extraction, the invention applies a Transformation Function to the data (step 903). This is a mathematical transformation function that converts the multi-dimensional observation data into a three-dimensional vector. This process can be quite complex and may be any linear or non-linear combination of the observation data. For example, the observation data may be a two-dimensional array corresponding to a certain rectangular region of the note, wherein each point in the two-dimensional array is a three-dimensional value containing a red, green, and blue reflectance value. The Transformation Function may convert this into a single three-dimensional measurement that contains a mean hue, saturation, and luminance value for the entire rectangular region.

The Transform Type determines which specific transformation will be applied out of several that are implemented. This may vary from one measurement to another (several measurements may be used for each document processed). Transformation Parameters vary by transformation type and govern the Transformation Function. For example, there may be weights to apply to each bit-plane to generate each component of the measurement vector.

The application of the transformation function uses calibration parameters which are corrections for things such as camera optics and illumination variations that remove the differences from one system to another.

After the Transformation Function has been applied to the data, the system projects the resulting vector onto a reference vector to yield a scalar fitness value (step 904). As explained above, the output of the Transformation Function is a single three-dimensional measurement (i.e. a point in some three dimensional space). The projection process computes the projection of this point to some reference vector (or "fitness vector") in this space, i.e. the distance along the vector to which the measurement point would project. The measurement space and reference vector are chosen such that there is a separation of notes of different fitness along the vector (see FIG. 10). These are empirically determined for each currency type, denomination and series.

Generally, notes would move from one end of the vector to the other as they become more unfit so that the distance along this vector is a good estimate of their level of fitness. The goal is to choose this measurement space and fitness vector such that other factors that may corrupt the fitness reading (such as print variations or paper variations) will move the measurement point in a direction perpendicular to the fitness vector and thus not affect the fitness reading.

Steps 902-904 may be replicated a number of times for each note, either on different regions of the note or on the same region but with different parameters. This results in a number of fitness values for a single note. These can be combined to yield a single combined fitness value for the note. In a preferred embodiment of the present invention, the different fitness values are combined in a weighted average (step 905). The measurement weights that govern this process are empirically determined.

In an alternate embodiment of the present invention, step 905 comprises simply selecting the "most unfit" value.

After the combined fitness value is determined, the system applies Level Mapping using Mapping Tables (step 906). This process uses a look-up table to map the combined fitness value for the document into one of several fitness levels which are used for sorting the note. In one embodiment of the invention 16 fitness levels are used for sorting. Each document type may have a different mapping table.

The process steps illustrated in FIG. 9 can also be applied for the same note using multiple cameras within the same currency processor. Because only one camera is used for each sequential illumination imaging, only one side of a note is recorded at a time. Therefore, a second camera with it own corresponding light sources can be placed at another location in the processor that allows the opposite side of the note to be recorded as well. Steps 901-906 would be applied using this second camera position; Such a dual camera configuration would yield an overall scalar fitness score for each side of the note, which can then be combined to determine an overall note fitness score.

Figure 10:
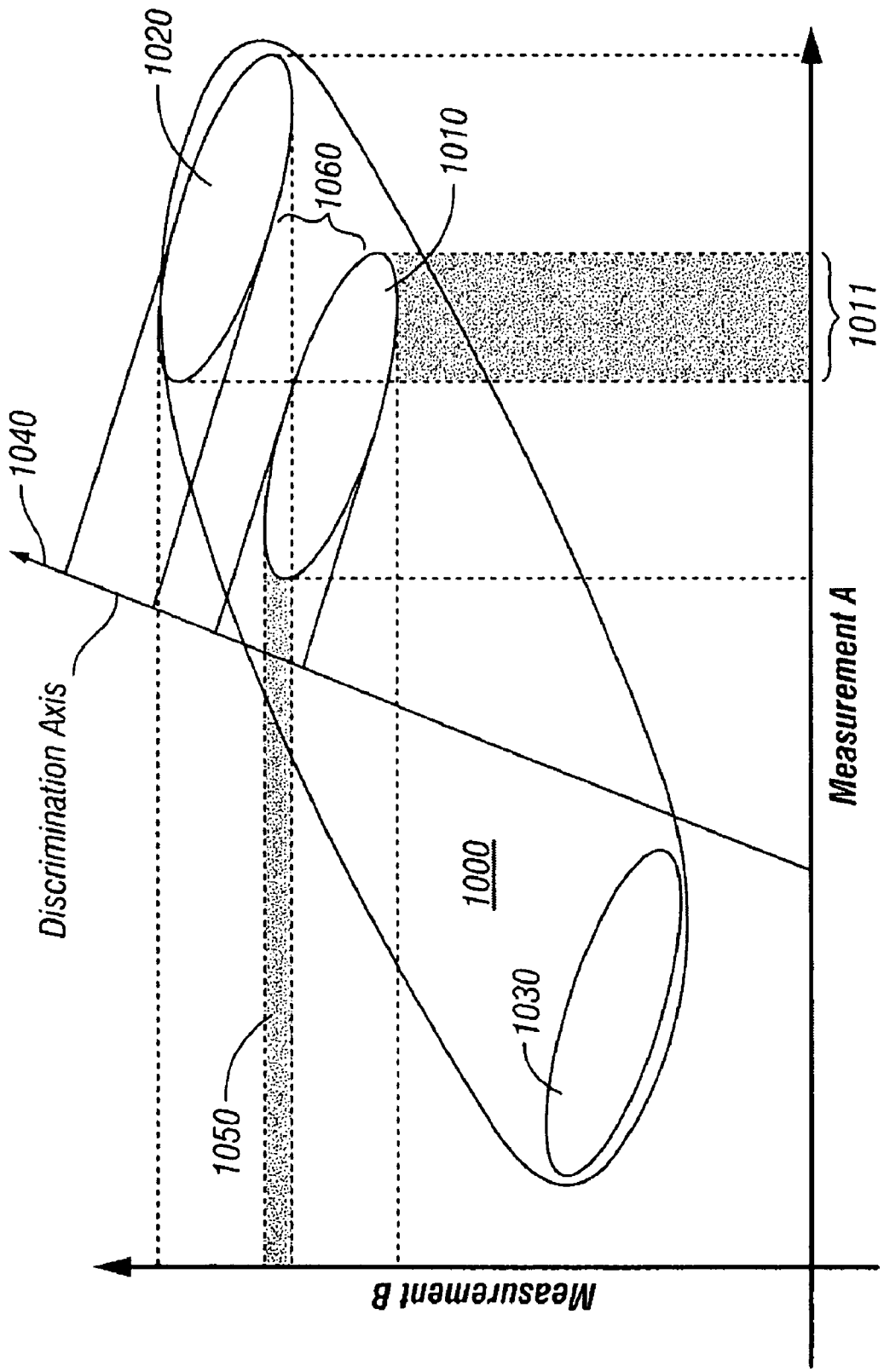
FIG. 10 shows a multi-dimensional measurement space in accordance with the present invention.

FIG. 10 shows a multi-dimensional measurement space in accordance with the present invention. The measurement space represented in FIG. 10 includes two axes, A and B, which each represent the reflectance of different types of light. For example, the axes may represent different colors (red, green or blue) cross referenced against each other, or they may represent white light reflectance cross referenced against one of the isolated colors.

FIG. 10 shows two types of space. The larger space 1000 encompasses the field of all banknotes over the domain of measurements along axes A and B. Within this larger field are smaller fields 1010, 1020, 1030, which each represent notes of a single class (e.g. a particular fitness level).

In the present example, the measurements along the A axis resemble the measurement results for single spectrum reflectance shown in FIG. 2. Similar to FIG. 2, the example shown in FIG. 10 shows an overlap in measurements of note 1010 and note 1020 along axis A. As explained above, this overlap region 1011 can make it impossible to distinguish between two notes of different fitness classes based merely on a single-dimensional analysis of light reflectance. However, the distinction between the fitness levels of the notes becomes easier to see when viewed from another angle.

FIG. 10 shows how the separation between fitness levels 1010 and 1020 becomes clear when measured along axis 1040. For this reason, axis 1040 can be considered the discrimination axis (or fitness vector described above). Whereas the measurement along axis A might be the reflectance of white light, axis B may represent the reflectance of red, green, or blue. Because of the different reflectance produced by different colors of light (as shown in FIG. 4), the measurement of brightness along axis B will differ from that of axis A.

As with axis A, reflectivity measurements along axis B may have an overlap region 1050 between different fitness levels 1010 and 1020. The discrimination axis 1040 determined from cross referencing axis A against axis B reveals the area of distinction 1060 between the different fitness levels 1010, 1020 that are not visible from either axis A or axis B is isolation. As such, the multi-dimensional measurement and analysis used by the present invention yields a much more precise level of fitness discrimination over the single-dimensional measurement of the prior art. The fitness standards provided by the present invention are better matched to human perception and allow better control over quality of notes in circulation. As a result, fewer fit notes are destroyed and fewer unfit notes are re-circulated.

The methods of sequential illumination described above are not limited to use with currency notes. They can also be applied to other types of documents that circulate widely such as checks, bonds, share certificates, etc.

Although preferred embodiments of the present invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the appended claims.

I claim:

1. A method for determining the physical fitness of documents, the method comprising the steps of:
   (a) passing a document past an image sensor;
   (b) illuminating said document sequentially using multi-mode illumination, wherein the document is divided into discrete successive sections and a predetermined illumination mode is applied to each section as the document passes said image sensor until the entire document is imaged, producing an interleaved, multi-mode image of the document;
   (c) applying a multi-dimensional transformation function to said interleaved, multi-mode image to generate a composite measurement; and
   (d) projecting said composite measurement onto an empirically determined fitness vector to yield a scalar fitness value for said document;
   wherein the image sensor is a line scan camera and a predetermined illumination mode is applied to each scan line.

2. The method according to claim 1, further comprising mapping said scalar fitness value to a predefined table of fitness classes.

3. The method according to claim 1, wherein steps (c) and (d) are repeated using different parameters to yield multiple scalar fitness values.

4. The method according to claim 3, further comprising combining said multiple scalar fitness values to produce an overall scalar fitness value for said document.

5. The method according to claim 1, wherein the mode of illumination is determined by at least one of the following parameters:
   color;
   angle of incidence to the document; or reflective versus transmissive illumination.

6. The method according to claim 5, wherein the color of illumination is at least one of the following alone or in combination:
   red; green; blue; white; infrared; or ultraviolet.

7. The method according to claim 1, further comprising using multiple image sensors within a single document processor and calculating a combined fitness value for said document.

8. The method according to claim 7, wherein a different image sensor is used to image each face of said document.

9. A system for determining the physical fitness of documents, comprising:
   (a) an image sensor;
   (b) at least two different light sources, wherein each light source produces a different illumination mode;
   (c) means for synchronizing said image sensor with said light sources to sequentially illuminate a document passing in front of the image sensor, wherein the document is divided into discrete successive sections and a predetermined illumination mode is applied to each section until the entire document is imaged, producing an interleaved, multi-mode image of the document;
   (d) means for applying a multi-dimensional transformation function to said interleaved, multi-mode image to generate a composite measurement; and
   (e) means for projecting said composite measurement onto an empirically determined fitness vector to yield a scalar fitness value for said document;
   wherein the image sensor is a line scan camera and wherein a predetermined illumination mode is applied to each scan line.

10. The system according to claim 9, further comprising means for mapping said scalar fitness value to a predefined table of fitness classes.

11. The system according to claim 9, wherein the mode of illumination is determined by at least one of the following parameters:
   color;
   angle of incidence to the document; or reflective versus transmissive illumination.

12. The system according to claim 11, wherein the color of illumination is at least one of the following alone or in combination:
   red; green; blue; white; infrared; or ultraviolet.

13. The system according to claim 9, further comprising:
   multiple image sensors; and
   means for calculating a combined fitness value for said document.

\* \* \* \* \*